United States Patent
Ochi et al.

(10) Patent No.: US 12,499,865 B2
(45) Date of Patent: Dec. 16, 2025

(54) NOISE CONTROL METHOD AND NOISE CONTROL DEVICE

(71) Applicant: Nissan Motor Co., Ltd., Yokohama (JP)

(72) Inventors: Daisuke Ochi, Kanagawa (JP);
Yoshiharu Nakaji, Kanagawa (JP);
Toshio Enomoto, Kanagawa (JP);
Masaya Gotou, Kanagawa (JP);
Wataru Ogose, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 146 days.

(21) Appl. No.: 18/294,576

(22) PCT Filed: Aug. 18, 2021

(86) PCT No.: PCT/JP2021/030133
§ 371 (c)(1),
(2) Date: Feb. 2, 2024

(87) PCT Pub. No.: WO2023/021596
PCT Pub. Date: Feb. 23, 2023

(65) Prior Publication Data
US 2024/0347032 A1    Oct. 17, 2024

(51) Int. Cl.
*G10K 11/16* (2006.01)
*G10K 11/178* (2006.01)

(52) U.S. Cl.
CPC .... *G10K 11/1783* (2018.01); *G10K 11/17821* (2018.01)

(58) Field of Classification Search
CPC .................... G10K 11/1783; G10K 11/17821
USPC ................................................ 381/71.4, 71.1
See application file for complete search history.

(56) References Cited

U.S. PATENT DOCUMENTS

| | | |
|---|---|---|
| 8,542,844 B2 | 9/2013 | Bowden et al. |
| 2006/0269078 A1 | 11/2006 | Sakamoto et al. |

FOREIGN PATENT DOCUMENTS

| | | | | |
|---|---|---|---|---|
| JP | H5-158487 A | | 6/1993 | |
| JP | 2006327540 A | * | 12/2006 | ....... G10K 11/17823 |
| JP | 2010-208456 A | | 9/2010 | |
| JP | 2012218732 A | * | 11/2012 | ....... G10K 11/17883 |

OTHER PUBLICATIONS

Extended European Search Report of Nov. 21, 2024 of corresponding European Patent Application No. 21953619.0.

* cited by examiner

*Primary Examiner* — Ammar T Hamid
(74) *Attorney, Agent, or Firm* — GLOBAL IP COUNSELORS, LLP

(57) ABSTRACT

A noise control device includes an engine to be mounted in a vehicle and a controller. The controller is configured to detect a state of the engine. The controller is configured to decrease a noise reduction performance due to a vibration input from a road surface in accordance with the state of the engine.

17 Claims, 8 Drawing Sheets

NOISE CONTROL METHOD AND NOISE CONTROL DEVICE

CROSS-REFERENCE TO RELATED APPLICATIONS

This application is a U.S. national stage application of International Application No. PCT/JP2021/030133, filed on Aug. 18, 2021.

BACKGROUND

Technical Field

The present invention relates to a noise control method and a noise control device.

Background Information

Inventions for reducing noise (primarily road noise) in the interior of a vehicle are known from the prior art (Japanese Laid-Open Patent Application No. 5-158487-herein after referred to as Patent Document 1). The invention described in Patent Document 1 stops adaptive action of an adaptive controller when the changes of transfer function from a noise source to an evaluation point are determined to exceed a specified state.

SUMMARY

According to the invention described in Patent Document 1, the interior noise of a vehicle is reduced. However, if the engine starts while the interior noise of the vehicle is reduced, the engine noise will be emphasized, which may cause passengers to feel uncomfortable.

The present invention was conceived in light of the problem described above, and an object thereof is to provide a noise control method and a noise control device that make the engine noise less noticeable to the passengers.

The noise control method according to one aspect of the present invention decreases performance for reducing noise caused by the vibration from the road surface as a function of the state of the engine.

By means of the present invention, it will be less likely that the passengers will notice engine noise.

BRIEF DESCRIPTION OF THE DRAWINGS

Referring now to the attached drawings which form a part of this original disclosure, selected embodiments of this disclosure are illustrated.

DETAILED DESCRIPTION OF EMBODIMENTS

Figure 1:
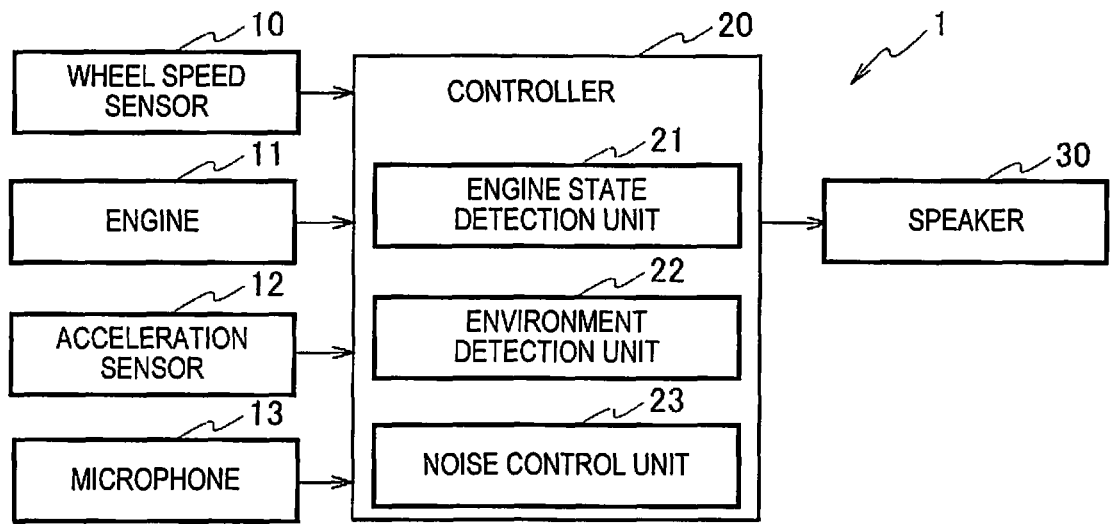
FIG. 1 shows an example of the configuration of a noise control device 1 according to an embodiment of the present invention.

Embodiments of the present invention will be described below with reference to the drawings. In the description of the drawings, the same parts have been assigned the same reference numerals and the descriptions thereof are not repeated.

An example of the configuration of a noise control device 1 is described below with reference to FIG. 1. The noise control device 1 is installed in a vehicle. As shown in FIG. 1, the noise control device 1 includes a wheel speed sensor 10, an engine 11, an acceleration sensor 12, a microphone 13, a controller 20, and a speaker 30.

The wheel speed sensor 10 detects the rotational speed of each tire and outputs a signal indicating the detected rotational speed to the controller 20.

In general, an engine mounted in a vehicle is used to drive the tires. However, the engine 11 according to the present embodiment will be described as only being used for the generation of electrical power. That is, the engine 11 according to the present embodiment is not connected to the tires but to a generator (not shown). The engine 11 turns the generator, generating electrical power. However, the engine is not limited in this way. As is usually the case, the engine 11 may be connected to the tires. The term "connected" as used here may also mean "indirectly connected" or "directly connected." The engine 11 outputs signals to the controller 20 indicating its own state. The state of the engine 11 includes, for example, a rotational speed of the engine 11, a state in which the engine 11 will start in the near future, and a state in which the engine 11 will stop in the near future. The signals output by the engine 11 to the controller 20 include a signal indicating the rotational speed of the engine 11, a signal indicating that the engine 11 will start in the near future, and a signal indicating that the engine 11 will stop in the near future.

A plurality of acceleration sensors 12 are installed. The installation locations of the acceleration sensors 12 are not particularly limited, and may be at or near the tires and at or near the engine 11, for example. As the vehicle travels, the acceleration sensors 12 detect vibrations from the road surface. The acceleration sensors 12 output the detected vibration data to the controller 20. The acceleration sensors 12 installed at or near the engine 11 detect the acceleration (vibration) of the engine 11. The greater the output and rotational speed of the engine 11, the greater the vibration of the engine 11. The greater the vibration of the engine 11, the greater the noise from the engine 11. The acceleration sensors 12 output the detected acceleration of the engine 11 to the controller 20.

A plurality of the microphones 13 are installed in the vehicle interior. The installation locations of the microphones 13 are not particularly limited, and may be on the ceiling or the seats (headrests) of the vehicle, for example. The sound input to the microphones 13 is converted into electronic signals and output to the controller 20 as sound data. The microphones 13 installed on the ceiling, seats, etc., in the vehicle interior detect noise from the engine 11.

The controller 20 is a general-purpose microcomputer that includes a CPU, memory, and an input/output unit. A computer program for serving as function as a noise control device 1 is installed in the microcomputer. Through execution of the computer program, the microcomputer functions as a plurality of information processing circuits included in the noise control device 1. Shown now is an example of realizing a plurality of the information processing circuits included in the noise control device 1 using software, but of course the information processing circuits can also be configured by preparing dedicated hardware to execute each of the following information processes shown below. The plurality of information processing circuits can also be configured in discrete hardware. The controller 20 includes an engine state detection unit 21, an environment detection unit 22, and a noise control unit 23 as examples of the plurality of information processing circuits.

The engine state detection unit 21 detects the state of the engine 11 using data obtained from the wheel speed sensor 10, the engine 11, the acceleration sensor 12, and the microphone 13. Examples of the state of the engine 11 were described above. The engine state detection unit 21 outputs a signal in accordance with the state of the engine 11 to the noise control unit 23.

The environment detection unit 22 detects the environment of the vehicle using data obtained from the wheel speed sensor 10, the engine 11, the acceleration sensor 12, and the microphone 13. The "environment of the vehicle" in the present embodiment will be described below. The environment detection unit 22 outputs a signal in accordance with the environment of the vehicle to the noise control unit 23.

The noise control unit 23 analyzes the vibration data obtained from the acceleration sensor 12 and the sound data obtained from the microphone 13. The noise control unit 23 generates a sound signal of opposite phase to the analyzed vibration data and the sound data. The noise control unit 23 outputs the generated sound signal from the speaker 30. This reduces the noise since the noise is cancelled by the out-of-phase waveforms. Such a method of noise control is called "active noise control," a well-known technology. "Active noise control" may be simply abbreviated as "ANC" below. The noise control unit 23 changes the performance of ANC based on signals obtained from the engine state detection unit 21 or the environment detection unit 22.

Next, an example of the operation of the noise control device 1 is described with reference to FIG. 2. In Step S101, the engine state detection unit 21 determines whether the state of the engine 11 has changed. If the engine state detection unit 21 determines that the state of the engine 11 has changed, the detection unit outputs a signal related to the determination to the noise control unit 23 (YES in Step S101). If, on the other hand, the engine state detection unit 21 determines that the state of the engine 11 has not changed, the detection unit outputs a signal related to the determination to the noise control unit 23 (NO in Step S101). In Step S103, the noise control unit 23 implements normal noise control. An example of the "normal noise control" is ANC itself. In Step S105, the noise control unit decreases the road noise reduction performance. "Road noise" is the noise caused by vibrations input from the road surface. More specifically, "road noise" is the noise generated by the friction and impact between the tires and the road surface while the vehicle is traveling. In the present embodiment, ANC reduces this "road noise."

The acceleration sensor 12 is primarily used to detect vibrations related to "road noise." To "decrease road noise reduction performance" means to decrease the performance for reducing "road noise" (i.e., to diminish the effect of ANC). As a specific example, this means suppressing the opposite phase sound output from the speaker 30. "Suppressing the opposite phase sound" means decreasing the amplitude of the sound output from the speaker 30 or changing the amplitude and frequency of the sound output from the speaker 30 from the state in which the effect of ANC is maximum. Suppressing the sound output from the speaker 30 in this way diminishes the effect of ANC and the interior noise of the vehicle becomes more pronounced. Thus, the starting sound (noise) of the engine 11 becomes drowned out by the interior noise of the vehicle, making it difficult for the passengers to notice the noise from the engine 11. Another effect is that the passengers are less likely to notice that the engine 11 has started. The engine 11 according to this embodiment is only used to generate electrical power. Therefore, as long as the battery has a sufficient SOC (STATE OF CHARGE), whether or not the engine 11 has started has little effect on the passengers. Therefore, in order to provide the passengers with a comfortable driving environment, it is necessary to make the noise from the engine 11 less noticeable to the passengers. This is achieved by means of the present embodiment.

Figure 2:
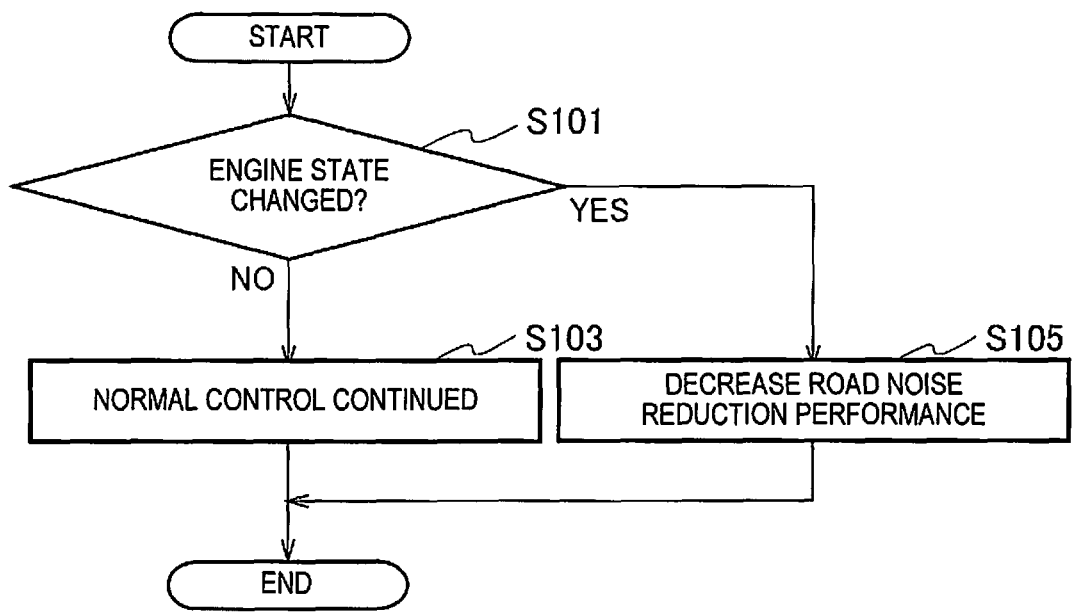
FIG. 2 shows a flowchart illustrating an example of the operation of the noise control device 1.
Figure 3:
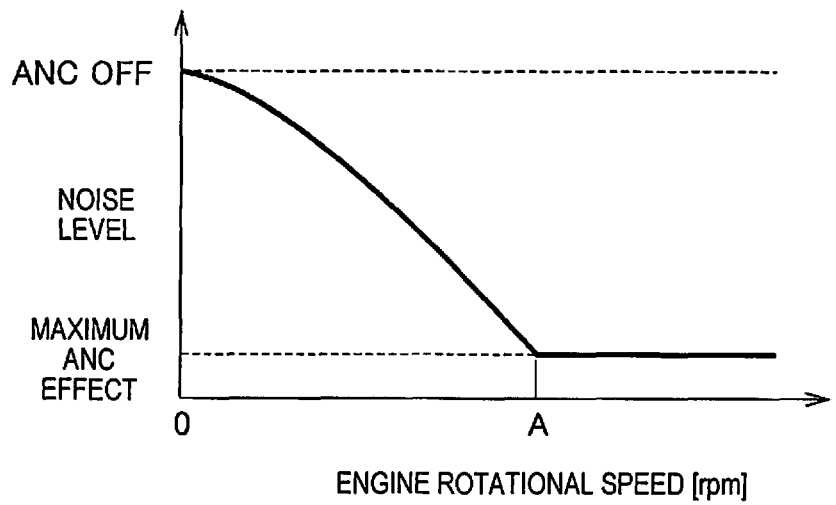
FIG. 3 shows a graph illustrating the relationship between engine speed and noise level.

An example of the "change of state of the engine 11" in Step S101 shown in FIG. 2 is the rotational speed of the engine 11. The noise control unit 23 decreases the road noise reduction performance when the rotational speed of the engine 11 changes between 0 and a prescribed rotational speed. This is explained with reference to FIG. 3. The horizontal axis in FIG. 3 indicates the rotational speed of the engine 11, and the vertical axis indicates the noise level of the vehicle interior. The interior noise level of the vehicle increases as one moves up the graph. "ANC OFF" means that ANC is not functioning. When ANC is not functioning, the noise level of the vehicle interior will, of course, be louder. "Maximum ANC effect" means that the effect of ANC is at its maximum. When the ANC effect is maximum, the interior noise level of the vehicle will be low. "Normal control" in Step S103 can be referred to "maximum ANC effect." As shown in FIG. 3, when the rotational speed of the engine 11 changes between 0 and a prescribed rotational speed, the noise control unit 23 decreases the road noise reduction performance in response to the rotational speed. For example, at the exact time the engine 11 starts, the noise control unit 23 stops ANC. As the rotational speed of the engine 11 gradually increases, the noise control unit 23 decreases the amount of reduction. When the rotational speed of the engine 11 reaches a prescribed rotational speed A, the noise control unit 23 returns ANC to normal operation. In other words, when the rotational speed of the engine 11 is below the prescribed rotational speed A, the noise control unit 23 decreases the road noise reduction performance. The noise control unit 23 may also set a prescribed rotational speed B between 0 and A and decrease the road noise reduction performance when the rotational speed of the engine 11 reaches B. The noise control unit 23 may also set a prescribed rotational speed C and a prescribed rotational speed D(C<D) between 0 and A and decrease the road noise reduction performance when the rotational speed of the engine 11 is between C and D.

Figure 4:
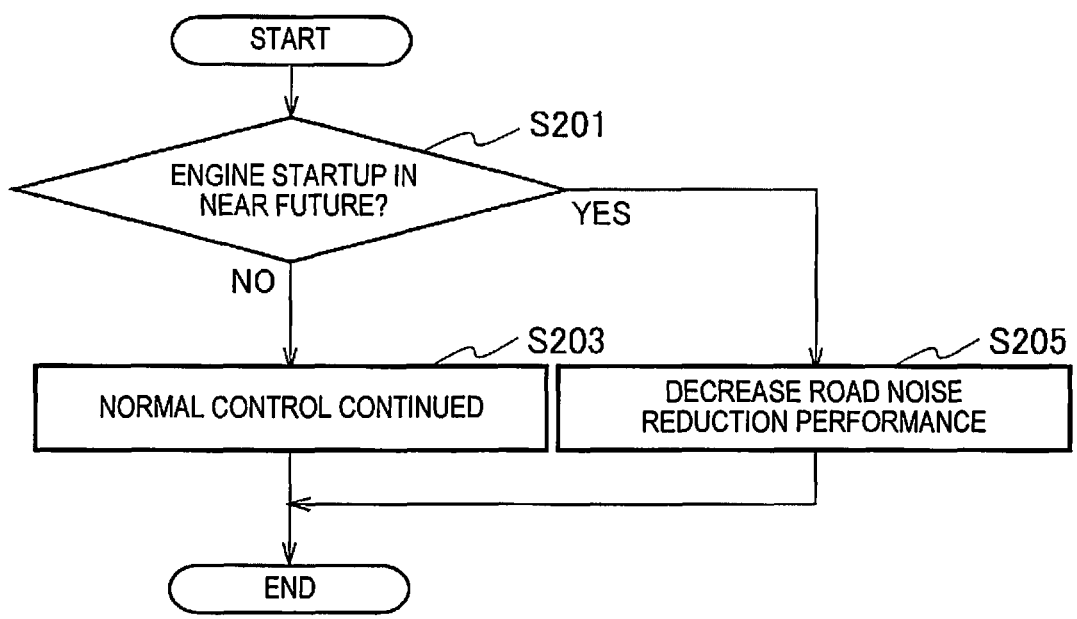
FIG. 4 shows a flowchart illustrating another example of the operation of the noise control device 1.
Figure 5:
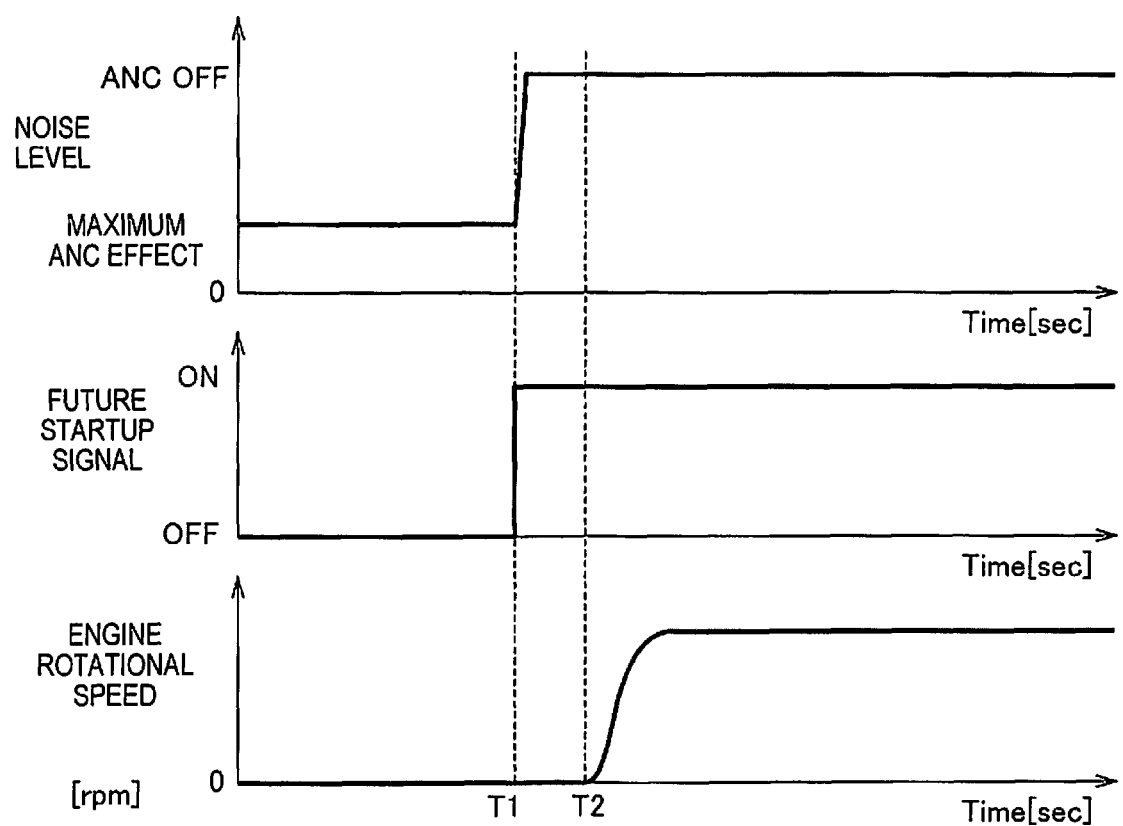
FIG. 5 shows graphs illustrating an example of timing for decreasing road noise reduction performance.
Figure 6:
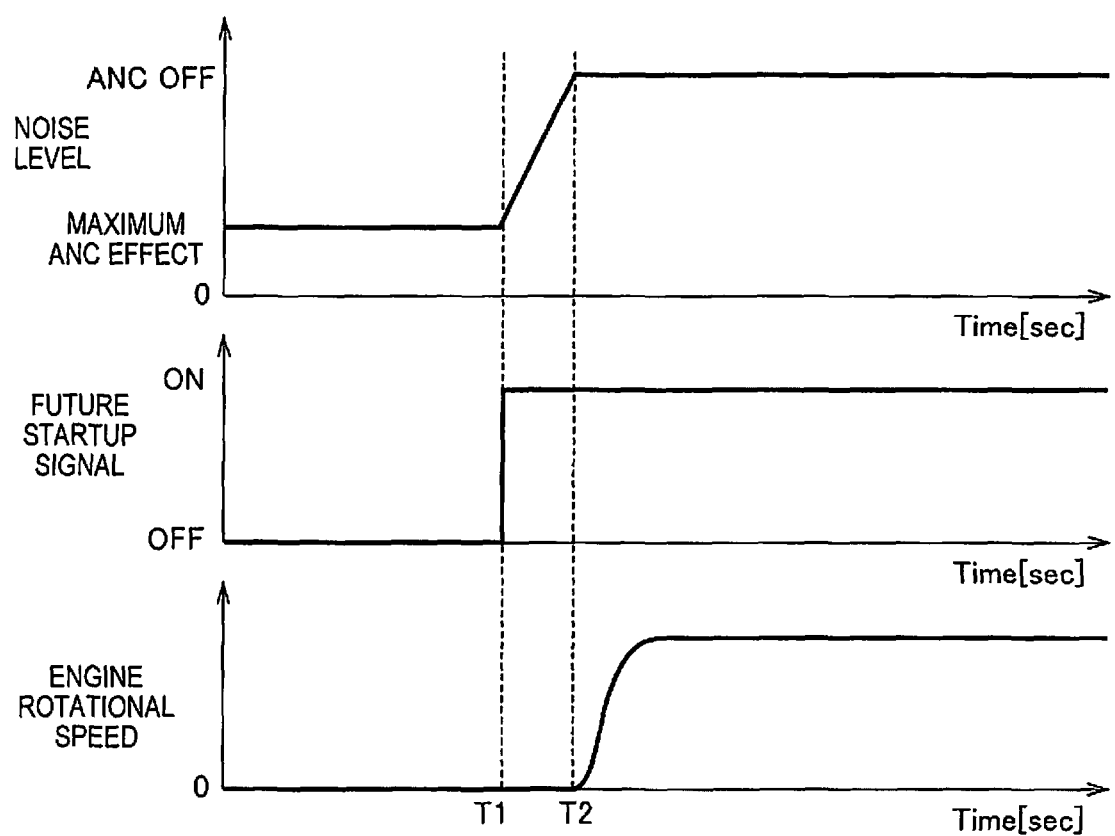
FIG. 6 shows graphs illustrating another example of timing for decreasing the road noise reduction performance.

An example of the "change of state of engine 11" in Step S101 shown in FIG. 2 is not limited to the rotational speed of the engine 11. The "change of state of engine 11" in Step S101 may indicate that the engine 11 will change to a state in which the engine will start up in the near future. This will be explained with reference to FIGS. 4 and 5. In Step S201 of FIG. 4, the engine state detection unit 21 determines whether the engine 11 is in a state in which the engine will start up in the near future. A signal output from the engine 11 is used for this determination. If the engine state detection unit 21 acquires a signal from the engine 11 indicating that the engine 11 will start up in the near future, the engine state detection unit determines that the engine 11 has changed to a state in which the engine will start up in the near future (YES in Step S201). The process then proceeds to Step S205. If the determination result is NO in Step S201, the process proceeds to Step S203. Since the processing in Steps S203 and S205 is the same as that in Steps S103 and S105, the description of these steps will be omitted. As used here, the "near future" is not particularly limited, but can be, for example, imminently in 5 seconds Time T1 shown in FIG. 5 indicates the time when the engine state detection unit 21 acquires a signal from the engine 11 indicating that the engine will start up in the near future. Time T2 indicates the time when the engine 11 starts. As shown, at time T1, the noise control unit 23 decreases the road noise reduction performance before the engine 11 starts. Thus, as shown at time T2, the startup sound of the engine 11 becomes drowned out by the interior noise of the vehicle, making it difficult for the passengers to notice the noise from the engine 11. Note that in FIG. 5, the noise control unit 23 stops ANC directly after time T1, but the present invention is not limited in this way. For example, as shown in FIG. 6, the noise control unit 23 may gradually decrease the road noise reduction performance from time T1 to time T2 and may stop ANC immediately before the engine 11 starts (time T2). Thus, compared to FIG. 5, it is possible to reduce the interior noise of the vehicle between time T1 and time T2. An example of a time when the device installed in the vehicle starts the engine 11 is when the SOC of the battery falls below a prescribed value.

Figure 7:
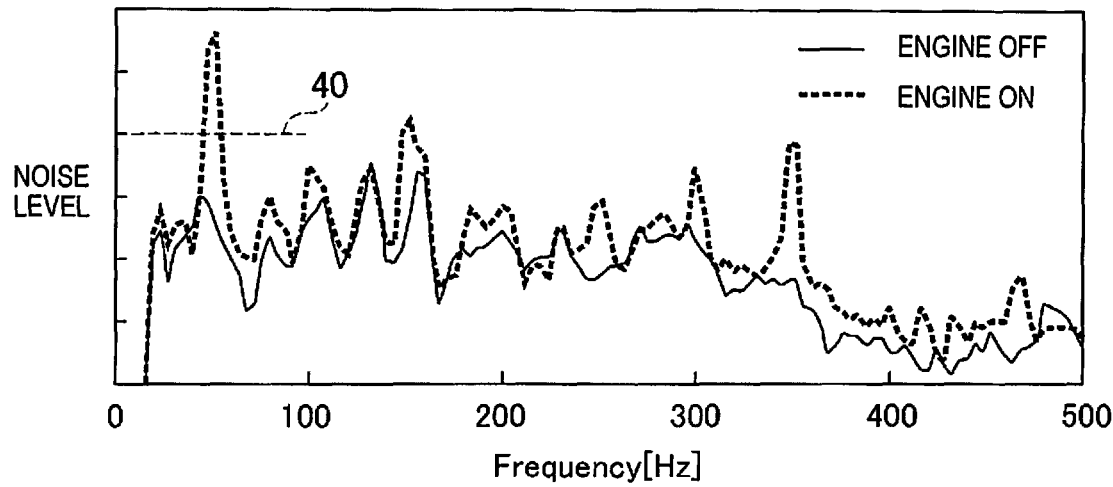
FIG. 7 shows a graph illustrating the relationship between frequency and noise level.

The "change of state of engine 11" in Step S101 shown in FIG. 2 may include a change in the data detected by the acceleration sensor 12 or the microphone 13. The acceleration sensor 12 detects the acceleration (vibration) of the engine 11. The microphone 13 detects the noise from the engine 11. The engine state detection unit 21 determines whether the data detected by the acceleration sensor 12 or the microphone 13 exceeds a prescribed value. If the data detected by the acceleration sensor 12 or the microphone 13 exceeds the prescribed value, the noise control unit 23 may decrease the road noise reduction performance. The fact that the data detected by the acceleration sensor 12 or microphone 13 exceeds the prescribed value means that the engine 11 is running. Therefore, by means of this method, the passengers will less likely notice the noise from the engine 11. Note that, as shown in FIG. 7, if the noise level associated with a specific frequency (the 1.5th order component of the engine 11), from among the frequencies associated with acceleration or noise, exceeds the noise level indicated by reference indicator 40, the noise control unit 23 may decrease the road noise reduction performance.

Figure 8:
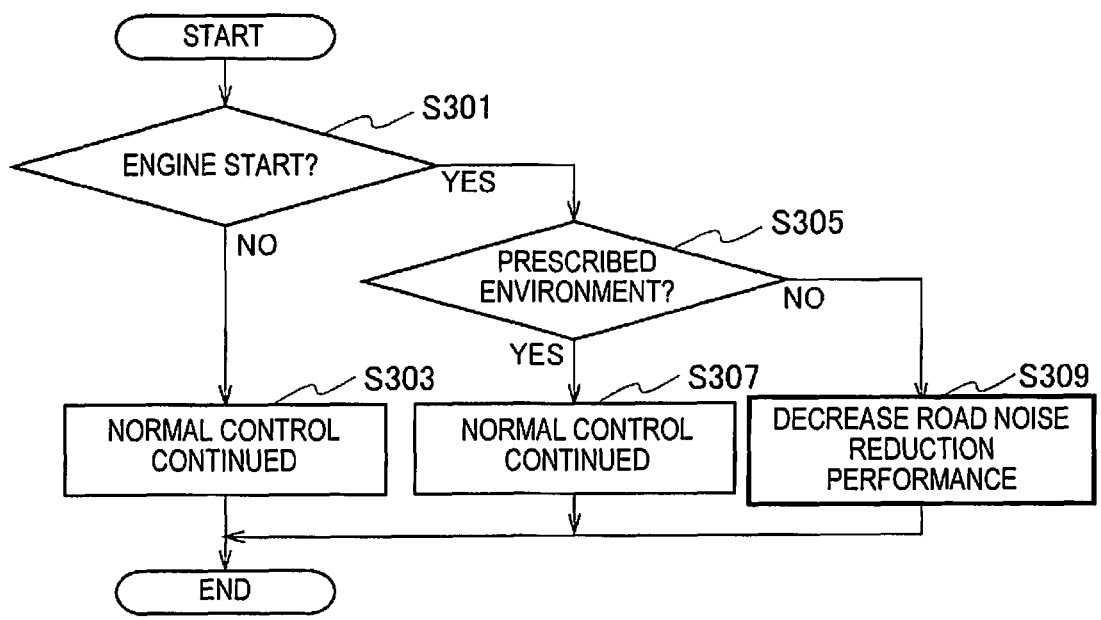
FIG. 8 shows a flowchart illustrating another example of the operation of the noise control device 1.

Another example of the operation of the noise control device 1 will now be described with reference to FIG. 8. However, since the process of Steps S303 and S307 is the same as that of Step S103 shown in FIG. 2, the description of these steps will not be repeated. Further, since the process of Step S309 is the same as that of Step S105 shown in FIG. 2, the description of this step will not be repeated. In Step S301, if the engine 11 has started (YES in Step S301), the process proceeds to Step S305. If, on the other hand, the engine 11 did not start up (NO in Step S301), the process proceeds to Step S303. In Step S305, the environment detection unit 22 detects the vehicle environment. If the vehicle environment is a prescribed environment (YES in Step S305), the process proceeds to Step S307. If, on the other hand, the vehicle environment is not a prescribed environment (NO in Step S305), the process proceeds to Step S309. Here, an example of "vehicle environment" will now be explained. An example of a "vehicle environment" is vehicle speed. If the vehicle speed exceeds a prescribed speed, the process result in Step S305 is YES. A vehicle speed greater than the prescribed speed indicates high road noise. In this case, the interior noise of the vehicle will be high, even with ANC. Thus, since the noise from the engine 11 becomes drowned out by the interior noise of the vehicle, there is no need to decrease the road noise reduction performance. Therefore, if the vehicle speed exceeds the prescribed speed, the noise control unit 23 does not decrease the noise reduction performance. "Does not decrease the noise reduction performance" means that normal ANC is performed. If, on the other hand, the vehicle speed is less than the prescribed speed (NO in Step S305), the noise control unit 23 decreases the road noise reduction performance (Step S309).

The "vehicle environment" may also include the data detected by the acceleration sensor 12 or microphone 13 immediately before the engine 11 starts. If the data detected by the acceleration sensor 12 or the microphone 13 immediately before the engine 11 starts exceeds a prescribed value, the process result in Step S305 is YES. The fact that the data detected by the acceleration sensor 12 or the microphone 13 immediately before the engine 11 starts exceeds a prescribed value indicates high road noise. Therefore, since the noise from the engine 11 becomes drowned out by the interior noise of the vehicle, there is no need to decrease the road noise reduction performance. Therefore, if the data detected by the acceleration sensor 12 or the microphone 13 immediately before the engine 11 starts exceeds the respective prescribed values, the noise control unit 23 does not decrease the noise reduction performance. If the data detected by the acceleration sensor 12 or microphone 13 immediately before the engine 11 starts is less than the respective prescribed values (NO in Step S305), the noise control unit 23 decreases the road noise reduction performance (Step S309).

Figure 9:
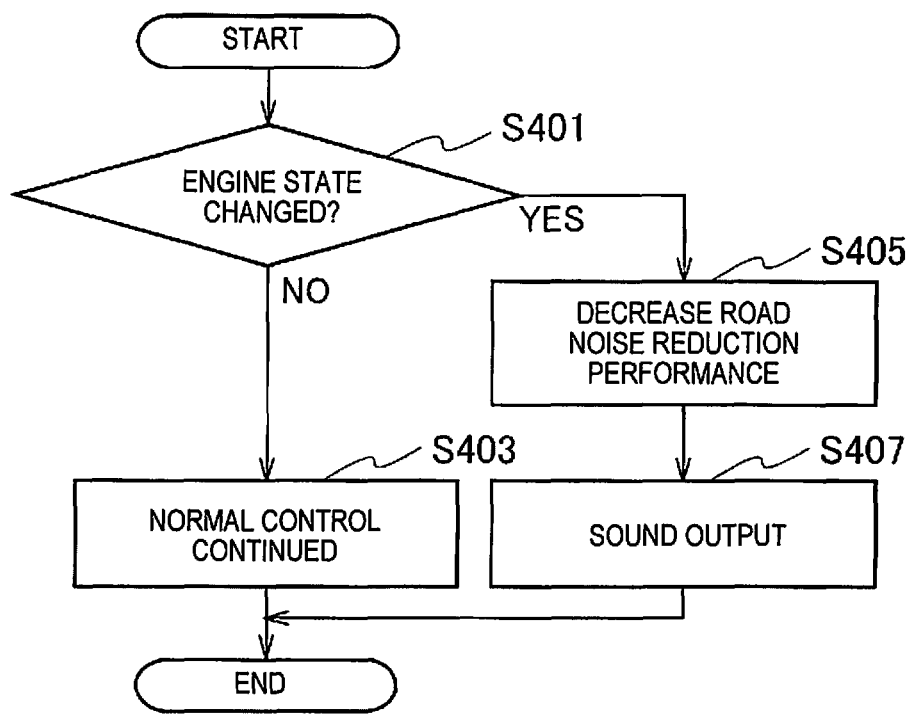
FIG. 9 shows a flowchart illustrating another example of the operation of the noise control device 1.
Figure 10:
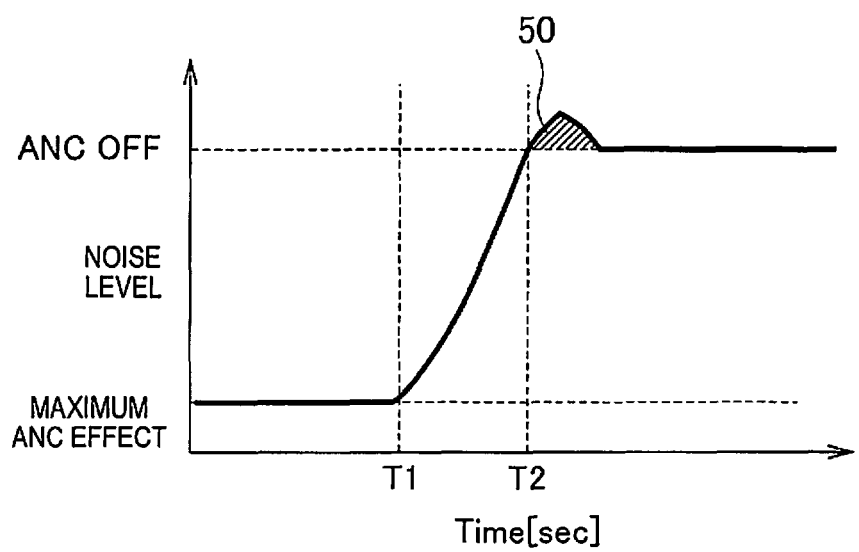
FIG. 10 shows a graph illustrating an example of sound output timing.

Another example of the operation of the noise control device 1 will now be described with reference to FIG. 9. However, since the process of Steps S401 to S405 is the same as that of Steps S101 to S105 shown in FIG. 2, the description of these steps will not be repeated. In Step S407, the noise control unit 23 outputs sound from the speaker 30. As a result of the process of Step S405, the road noise reduction performance is decreased. However, for example, if there were a small amount of road noise, even if the road noise reduction performance were decreased, the effect would be limited (the road noise would not be very loud). In this case, it is less likely that the startup sound of the engine 11 would be drowned out by the interior noise of the vehicle. In other words, the passengers would be more likely to notice the noise from the engine 11. Therefore, in Step S407, in order to drown out the startup sound of the engine 11, the noise control unit 23 would output sound from the speaker 30. Thus, it is possible to drown out the startup sound of the engine 11. As to what type of sound to output, for example, the noise control unit 23 may output from the speaker 30 sound louder than the road noise. Through analysis of the vibration acquired from the acceleration sensor 12, the amplitude and frequency associated with the road noise are known. By using sound of greater amplitude than the amplitude associated with the road noise, the noise control unit 23 can output from the speaker 30 sound that is louder than the road noise. The process of Step S407 may be expressed as outputting sound from the speaker 30 that is louder than the road noise. An example of the timing for outputting the sound will be described with reference to FIG. 10. Time T1 in FIG. 10 indicates the time when the road noise reduction performance begins to be decreased. Time T2 indicates the time when ANC is stopped. As shown in FIG. 10, the noise control unit 23 gradually decreases the road noise reduction performance and then stops the road noise reduction performance while simultaneously outputting sound from the speaker 30. Reference designator 50 indicates that the interior noise level of the vehicle has increased caused by the sound output. By increasing the interior noise level of the vehicle by outputting sound in this manner, the startup sound of the engine 11 can be drowned out.

Figure 11:
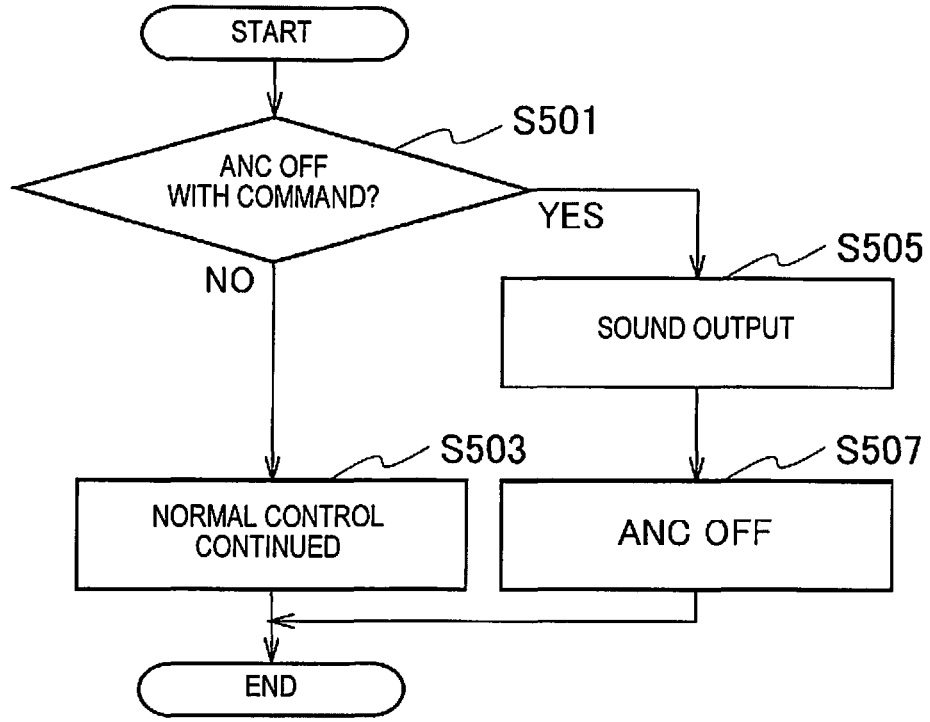
FIG. 11 shows a flowchart illustrating another example of the operation of the noise control device 1.

The "change of state of engine 11" in Step S101 shown in FIG. 2 may include an abnormality of the engine 11. In the present embodiment, "abnormal" means not normal. The idea of "abnormality" here includes not only failures that prevent constituent parts from executing the original functions thereof, but also defects that do not lead to failures or signs of failure. Processing when an abnormality of the engine 11 is detected will be described with reference to FIG. 11. If an abnormality of the engine 11 is detected, a command to stop ANC is output (YES in Step S501). In Step S505, the noise control unit 23 outputs sound from the speaker 30. The method of outputting sound is the same as that of FIG. 9. In this way, passengers can be notified that an abnormality of the engine 11 has occurred. In Step S507, the noise control unit 23 stops ANC. The process shown in FIG. 11 is not limited to abnormalities of the engine 11. In addition to the engine 11, the vehicle is provided with other equipment. More specifically, such equipment includes the generator, motor, inverter, battery, ANC system, etc. If an abnormality of the equipment or in the operation thereof is detected, the same process is performed as that used when an abnormality of the engine 11 is detected. Such a process is based on a fail-safe perspective. Note that in Step S507, instead of stopping ANC, the noise control unit 23 may notify the occupant (user in the vehicle) of ANC stop guidance. The stop guidance may be displayed on a display (e.g., a display of a navigation device) or output as a voice from the speaker 30. Upon receiving the stop guidance, a passenger may stop ANC by pressing a virtual switch that appears on the display or a physical switch installed in the vehicle.

Operation and Effects

As explained above, the noise control device 1 according to the present embodiment provides the following operation and effects.

The noise control device 1 includes the engine 11 mounted in the vehicle and the controller 20 that detects the state of the engine 11. The controller 20 decreases the performance for reducing noise caused by the vibrations input from the road surface in accordance with the state of the engine 11. An example of the "noise caused by the vibrations input from the road surface" is the "road noise" described above. By means of the noise control device 1, the noise from the engine 11 is drowned out by the interior noise of the vehicle, thereby making it less likely that the passengers will notice the noise from the engine 11. The "noise from the engine 11" includes the "startup sound of the engine 11" and "driving sound of the engine 11." Another effect is that the passengers are less likely to notice that the engine 11 has started.

The state of the engine 11 includes the rotational speed of the engine 11. The controller 20 decreases the noise reduction performance when the speed of the engine 11 reaches a prescribed rotational speed. An example of a "prescribed rotational speed" is "prescribed rotational speed B." By means of the noise control device 1, the noise from the engine 11 is drowned out by the interior noise of the vehicle, thereby making it less likely that the passengers will notice the noise from the engine 11.

The state of the engine 11 includes a state in which the engine 11 will start in the near future. When the controller 20 receives a signal indicating that the engine 11 will start in the near future, the controller decreases the noise reduction performance. In this way, the startup sound of the engine 11 becomes drowned out by the interior noise of the vehicle, thereby making it less likely that the passengers will notice the noise from the engine 11.

When the controller 20 receives a signal indicating that the engine 11 will start in the near future, the controller gradually decreases the noise reduction performance before the engine 11 starts, and, then immediately before the engine 11 starts, stops the noise reduction performance. In this way, the road noise can be reduced until just before the engine 11 starts. Since the startup sound of the engine 11 then becomes drowned out by the interior noise of the vehicle, the passengers will be less likely to notice the noise from the engine 11.

The state of the engine 11 includes the vibration data detected by the acceleration sensor 12 or the noise data detected by the microphone 13. When the noise level indicated by the vibration data related to the engine 11 or the noise level indicated by the noise data noise data related to the engine 11 exceeds a prescribed value, the controller 20 decreases the noise reduction performance. In this way, the noise from the engine 11 is drowned out by the interior noise of the vehicle, thereby making it less likely that the passengers will notice the noise from the engine 11.

The controller 20 decreases the noise reduction performance when the noise level associated with a prescribed frequency, from among the frequencies indicated by the vibration data related to the engine 11 or the noise data related to the engine 11, exceeds a prescribed value. In this way, the noise from the engine 11 is drowned out by the interior noise of the vehicle, thereby making it less likely that the passengers will notice the noise from the engine 11.

The controller 20 detects the vehicle environment. The controller 20 does not decrease the noise reduction performance in accordance with the detected vehicle environment after the engine 11 starts. This is because the noise from the engine 11 will be drowned out by the interior noise of the vehicle when the interior noise level of the vehicle is already high.

The vehicle environment includes the vehicle speed. If the vehicle speed exceeds a prescribed speed after the engine 11 starts, the controller 20 does not decrease noise reduction performance. That the vehicle speed exceeds the prescribed speed indicates a high level of road noise. Since the noise from the engine 11 is drowned out by the interior noise of the vehicle, there is no need to decrease road noise reduction performance.

The vehicle environment includes the vibration data detected by the acceleration sensor 12 or the noise data detected by the microphone 13. If the noise level indicated by the vibration data or the noise data detected immediately before the engine 11 starts exceeds a prescribed value, the controller 20 does not decrease noise reduction performance. That these noise levels exceed the prescribed value indicates a high level of road noise. Since the noise from the engine 11 is drowned out by the interior noise of the vehicle, there is no need to decrease road noise reduction performance. "Vibration data" here means "vibration data that excludes the engine 11." Similarly, "noise data" here means "noise data that excludes engine 11."

The controller 20 decreases the noise reduction performance in accordance with the state of the engine 11 and then stops the noise reduction performance while simultaneously outputting sound from the speaker 30. In this way, it is possible to drown out the noise from the engine 11.

If an abnormality of the equipment installed in the vehicle or in the operation of the equipment is detected, a command to stop the noise reduction performance is output to controller 20. When the controller 20 receives the command, the controller stops the noise reduction performance after outputting sound from the speaker 30, or provides noise reduction performance stop guidance to the passengers after outputting sound from the speaker 30. In this way, the passengers can be notified that an abnormality of the equipment or in the operation of the equipment has occurred.

Each of the functions described in the embodiment can be implemented by one or more processing circuits. The processing circuits include programmed processing devices, such as processing devices comprising electrical circuitry. The processing circuits also include devices such as application-specific integrated circuits (ASICs) and circuit components arranged to perform the described functions.

As described above, an embodiment of the present invention described above, but the statements and drawings that constitute part of this disclosure should not be understood as limiting the present invention. It will be apparent to those skilled in the art that various alternative embodiments, implementations, and operating techniques are possible from the present disclosure.

Other Embodiments

Figure 12:
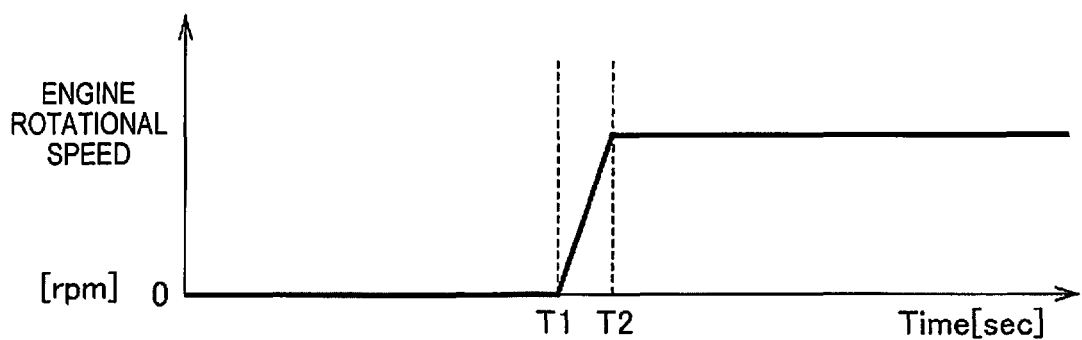
FIG. 12 shows another example of the operation of the noise control device 1.

Another example of the operation of the noise control device 1 will be described with reference to FIG. 12. Time T1 in FIG. 12 indicates the time at which the engine 11 starts. Time T2 indicates the time at which the engine 11 transitions to steady state. The period between time T1 and time T2 indicates the time from the starting of the engine 11 until the transition to steady state. "Steady state" refers to a state in which the rotational speed of the engine 11 is maintained at a constant speed. "Steady state" may also be expressed as a state in which the temporal variation in the rotational speed of the engine 11 is less than a prescribed value. The controller 20 reduces the noise related to the engine 11 when the engine 11 starts, and reduces the noise caused by the vibration input from the road surface when the engine 11 stops. In other words, the controller 20 reduces the noise caused by the vibration input from the road surface until time T1. The controller 20 reduces the noise related to the engine 11 after time T2. As a result, road noise is reduced until the engine 11 starts, and noise related to the engine 11 is reduced after the engine 11 starts.

Figure 13:
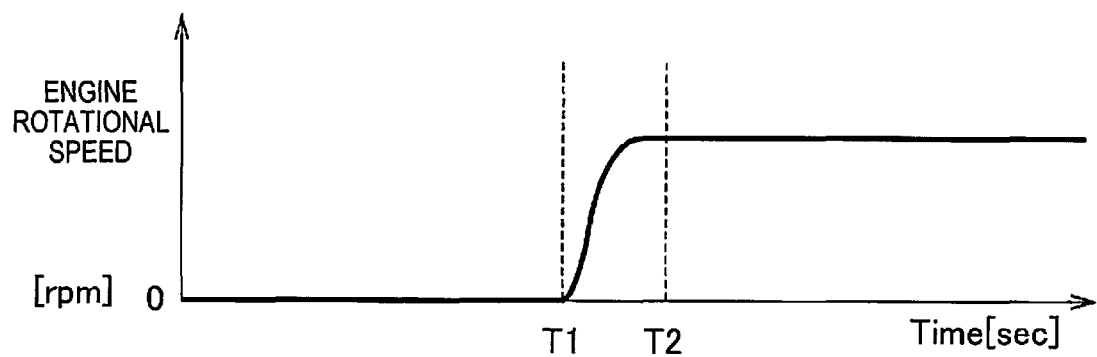
FIG. 13 shows another example of the operation of the noise control device 1.
Figure 14:
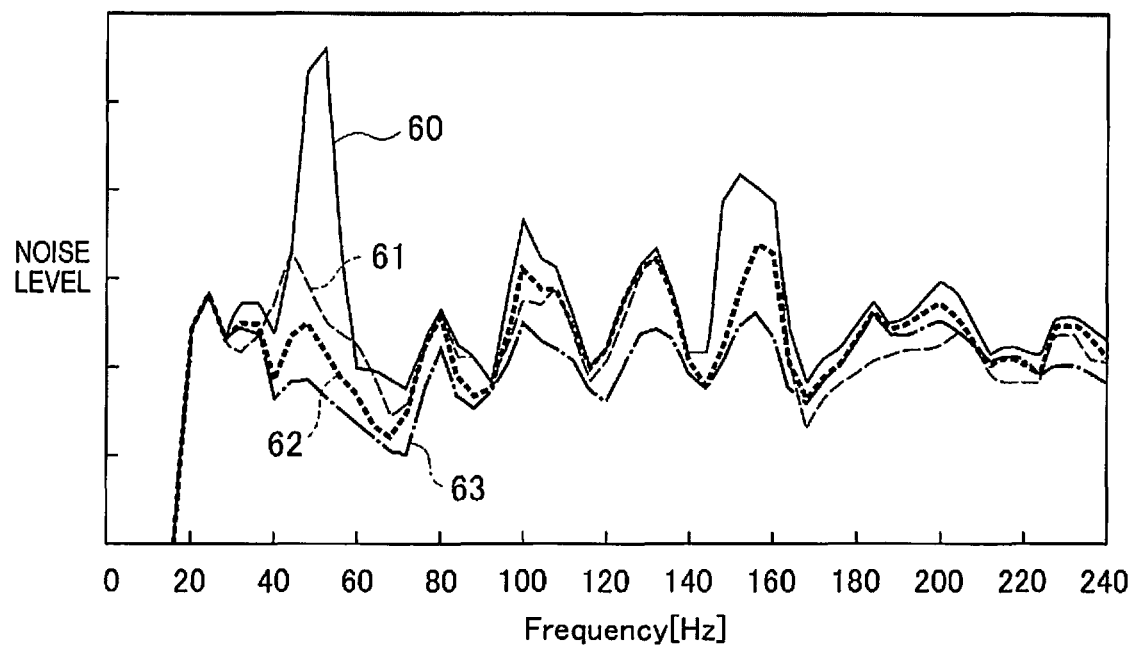
FIG. 14 shows another graph illustrating the relationship between frequency and noise level.

The engine 11 may transition to steady state and then the engine 11 may continue to operate. Time T1 in FIG. 13 indicates the time at which the engine 11 starts. Time T2 is an arbitrary time point indicating that the engine 11 continues to operate after having transitioned to steady state. The controller 20 detects temporal variations in the rotational speed of the engine 11. When the temporal variation in the rotational speed of the engine 11 is less than a prescribed value and the engine 11 is in operation, the controller 20 does not reduce the noise caused by the vibration input from the road surface but only the noise related to the engine 11. The passengers will thereby be less likely to notice the noise from the engine 11. When the "temporal variation in the rotational speed of the engine 11 is less than a prescribed value and the engine 11 is in operation" indicates that the engine 11 is continuously operating after having transitioned to steady state, such as at time T2. Reference designator 60 in FIG. 14 indicates that the engine 11 starts and ANC stops. Reference designator 61 indicates that engine 11 is stopped and ANC is deactivated. Reference designator code 62 indicates that ANC is in operation using all sensors. Reference designator 63 indicates that only the data detected by the acceleration sensor 12 and the microphone 13 installed in the engine 11 are used. As indicated by reference designator 63, the interior noise level of the vehicle is reduced by reducing only the noise related to the engine 11, thereby making it less likely that the passengers will notice the noise from the engine 11.

That "engine 11 is stopped" may be taken to mean that the rotational speed of the engine 11 is zero. "Noise related to the engine 11" may be defined as noise indicated by the data detected by the acceleration sensor 12 or the microphone 13 installed in the engine 11. "Noise caused by the vibration input from the road surface" may be defined as the noise indicated by the data detected by the acceleration sensor 12 or the microphone 13 installed at locations other than the engine 11. When the rotational speed of the engine 11 is zero, the controller 20 may not reduce the noise related to the engine 11, but may reduce the noise caused by the vibration input from the road surface. This effectively reduces road noise.

When the temporal variation in the rotational speed of the engine 11 is less than a prescribed value and the engine 11 is in operation, the controller 20 may reduce the noise related to the engine 11 using, of the data detected by the plurality of acceleration sensors 12, only the data detected by the acceleration sensors 12 installed in the engine 11. The passengers will thereby be less likely to notice the noise from the engine 11.

In ANC, only the data from the acceleration sensor 12, only the data from the microphone 13, or both the data from the acceleration sensor 12 and the microphone 13 may be used.

The invention claimed is:

1. A noise control method for a noise control device including an engine that is installed in a vehicle and that is selectively operated and stopped while the vehicle is traveling, and a controller that detects whether the engine is in a running state or in a stopped state, the noise control method comprising:
using the controller to
reduce a noise caused by a vibration input from a road surface when the engine is in the running state, and decrease a noise reduction performance of the reducing the noise caused by the vibration input from the road surface when the engine is in the stopped state.

2. A noise control method for a noise control device including an engine installed in a vehicle and a controller that detects a state of the engine, the state of the state of the engine including a state in which the engine will start in a near future, the noise control method comprising:
using the controller to decrease noise reduction performance of a noise caused by a vibration input from a road surface in accordance with the state of the engine, and
using the controller to decrease the noise reduction performance upon reception of a signal indicating that the engine will start in the near future.

3. The noise control method according to claim 1, further comprising
using the controller to determine the running state based on a rotational speed of the engine and to decrease the noise reduction performance upon the rotational speed of the engine reaching a prescribed speed.

4. The noise control method according to claim 2, further comprising
using the controller to gradually decrease the noise reduction performance before the engine starts, and stop the noise reduction performance immediately before the engine starts upon receiving the signal indicating that the engine will start in the near future.

5. The noise control method according to claim 1, wherein
the controller determines the running state of the engine based on vibration data detected by an acceleration sensor or noise data detected by a microphone, and
the controller decreases the noise reduction performance when a noise level indicated by the vibration data related to the engine or by the noise data related to the engine exceeds a prescribed value.

6. The noise control method according to claim 5, wherein
the noise level is related to a prescribed frequency among the frequencies indicated by the vibration data related to the engine or the noise data related to the engine.

7. The noise control method according to claim 1, wherein
the controller detects a vehicle environment and does not decrease the noise reduction performance after the engine starts when the vehicle environment is not a prescribed environment.

8. The noise control method according to claim 7, wherein
the vehicle environment includes a vehicle speed, and
the controller does not decrease the noise reduction performance when the vehicle speed exceeds a prescribed speed after the engine starts.

9. The noise control method according to claim 7, wherein
the vehicle environment includes vibration data detected by an acceleration sensor or noise data detected by a microphone, and
the controller does not decrease the noise reduction performance when the noise level indicated by the vibration data or the noise data detected immediately before the engine starts exceeds a prescribed value.

10. The noise control method according to claim 1, wherein
after the controller decreases the noise reduction performance, the controller stops the noise reduction performance while simultaneously outputting sound from a speaker.

11. The noise control method according to claim 1, wherein a command to stop the noise reduction performance is output to the controller when an abnormality of equipment installed in the vehicle or in an operation of the equipment is detected, and
upon receiving the command, the controller stops the noise reduction performance after outputting sound from a speaker, or provides noise reduction performance stop guidance to a user in the vehicle after outputting sound from the speaker.

12. The noise control method according to claim 1, wherein
the controller reduces engine-related noise when the engine starts and reduces the noise caused by the vibration input from the road surface when the engine is stopped.

13. The noise control method according to claim 1, wherein
the controller detects a temporal variation in a rotational speed of the engine, and when the detected temporal variation is less than a prescribed value and the engine is in the running state, the controller does not reduce the noise caused by the vibration input from the road surface but reduces only engine-related noise.

14. The noise control method according to claim 12, wherein
the stopped state of the engine is defined to be a state in which a rotational speed of the engine is zero,
the engine-related noise is defined as noise indicated by data detected by an acceleration sensor or a microphone installed in the engine,
the noise caused by the vibration input from the road surface is defined as noise indicated by the data detected by an acceleration sensor or a microphone installed at a location other than the engine, and
when the rotational speed of the engine is zero, the controller does not reduce the engine-related noise but reduces the noise caused by the vibration input from the road surface.

15. The noise control method according to claim 13, wherein
a plurality of acceleration sensors are installed, and when the temporal variation is less than a prescribed value and the engine is in the running state, the controller reduces the engine-related noise using only data detected by an acceleration sensor installed in the engine from among data detected by the plurality of acceleration sensors.

16. A noise control device comprising:
an engine that is to be installed in a vehicle and that is selectively operated and stopped while the vehicle is traveling; and
a controller configured to detect a state of the engine, the state of the engine including a running state in which the engine is running and a stopped state in which the engine is stopped, and
the controller being configured to
reduce a noise caused by a vibration input from a road surface when the engine is in the running state, and
decrease a noise reduction performance of the reducing the vibration input from the road surface when the engine is in the stopped state.

17. A noise control device comprising:
an engine that is to be installed in a vehicle; and
a controller configured to detect a state of the engine, the state of the engine including a state in which the engine will start in a near future, the controller being configured to decrease a noise reduction performance caused by a vibration input from a road surface in accordance with the state of the engine, and decrease the noise reduction performance upon receiving a signal indicating that the engine will start in the near future.

* * * * *